United States Patent [19]

Matsuki et al.

[11] Patent Number: 5,324,693
[45] Date of Patent: Jun. 28, 1994

[54] CERAMIC COMPOSITES AND PROCESS FOR MANUFACTURING THE SAME

[75] Inventors: Ryuichi Matsuki; Takeyoshi Takenouchi; Hisao Ueda; Hiroshi Sasaki, all of Saitama, Japan

[73] Assignee: Mitsubishi Materials Corporation, Tokyo, Japan

[21] Appl. No.: 959,958

[22] Filed: Oct. 13, 1992

[51] Int. Cl.⁵ .................. C04B 35/54; C04B 35/56
[52] U.S. Cl. ............................... 501/89; 501/127
[58] Field of Search ............... 51/309; 252/516, 518; 501/89, 92, 96, 98, 127, 128, 153; 264/63, 65

[56] References Cited

U.S. PATENT DOCUMENTS

| | | | |
|---|---|---|---|
| 4,507,224 | 3/1985 | Toibana et al. | 252/516 |
| 4,528,121 | 7/1985 | Matsushita et al. | 252/516 |
| 4,647,405 | 3/1987 | Debely | 252/518 |
| 4,867,761 | 9/1989 | Brandt et al. | 51/309 |
| 5,059,564 | 10/1991 | Mehrotra et al. | 501/89 |
| 5,096,858 | 3/1992 | Das Chaklader et al. | 501/89 |
| 5,123,935 | 6/1992 | Kanamaru et al. | 51/309 |
| 5,141,900 | 8/1992 | Logan | 501/80 |
| 5,158,916 | 10/1992 | Claussen | 501/127 |
| 5,167,886 | 12/1992 | Cameron et al. | 264/63 |
| 5,177,037 | 1/1993 | Schuldies | 51/309 |

*Primary Examiner*—Anthony Green
*Assistant Examiner*—A. Wright
*Attorney, Agent, or Firm*—Kanesaka & Takeuchi

[57] ABSTRACT

The ceramic composites consisting of sintered alumina comprising a polycrystalline alumina matrix having a grain size of from 0.5 to 10 $\mu$m, and fine particles of $TiB_2$ 2 $\mu$m or less in diameter being dispersed in the alumina grains, the composite alumina ceramic containing from 15 to 40% by volume of $TiB_2$; or a ceramic composites comprising a polycrystalline alumina matrix as above, fine particles of $TiB_2$, and fine particles of SiC, the fine particles of $TiB_2$ and SiC being each 2 $\mu$m or less in diameter and being dispersed in the alumina grains, the ceramic composites containing from 5 to 30% by volume of $TiB_2$ and from 5 to 30% by volume of SiC.

8 Claims, No Drawings

CERAMIC COMPOSITES AND PROCESS FOR MANUFACTURING THE SAME

FIELD OF THE INVENTION AND RELATED ART STATEMENT

The present invention relates to a high strength ceramic composites and a process for manufacturing the same. More specifically, it relates to high strength ceramic composites having excellent heat and wear resistances, yet capable of being machined by an EDM (electric discharge machining) process and suitable as structural materials. The present invention relates also to a process for manufacturing the same.

Alumina (aluminum oxide, $Al_2O_3$) has been long used as an industrial material for a wide variety of applications because of its ready availability by sintering and of its superiority in, for example, refractoriness, corrosion resistance, and electric insulating properties. However, it is still inapplicable to structural materials because of its insufficient mechanical strength such as bending strength, fracture toughness, and resistance against thermal shock. Thus, as an approach to overcome those disadvantages, some of the R & D efforts have been paid on making composites thereof.

Those studies on manufacturing composites, however, were mostly concerned with how to achieve complexing in a micrometer scale, and hence the improvement of the mechanical properties was somewhat limited. It is generally believed that in a grain-dispersed composite, the cracks are deflected by the dispersed grains which are localized at the alumina grain boundaries, and that the toughness of the resulting sintered alumina is thereby increased.

In a ceramic sintering such as of alumina, the matrix thereof consists of anisotropic grains. Accordingly, the localized stresses generate at the grain boundaries by the thermal expansion mismatch between the matrix and dispersion: the localized compressive stress is accumulated during cooling down from the sintering temperature. Then, this grain boundary becomes a fracture source which decreases the strength of the whole sintering.

When fine particles are dispersed in a matrix, it is expected that the toughness is improved, because those particles avoid propagation of the cracks. However, a prior art technology that comprises dispersing those fine particles in the matrix was by no means effective in significantly increasing the strength, because there was no change in the grain boundaries which function as the source for fractures.

OBJECT AND SUMMARY OF THE INVENTION

An object of the present invention is to overcome the prior art problems mentioned hereinbefore, and to provide a high strength (refractory) ceramic composites and a process for manufacturing the same.

An another object of the present invention is to provide, by controlling microstructures, ceramic composites having considerably improved in thermal shock fracture resistances, fracture strength and fracture toughness, thereby making it suitable for use as refractories, wear-resistant materials, cutting tool materials, corrosion-resistant materials, and the like. It is still another object to provide a process for manufacturing the same.

The ceramic composites according to an embodiment of the present invention an characterized by that it comprises an alumina ($Al_2O_3$) matrix comprising crystal grains from 0.5 to 10 μm in diameter, the alumina crystal grains having dispersed therein from 15 to 40% by volume of fine titanium diboride ($TiB_2$) particles 2 μm or less in particle size.

The ceramic composites according to another embodiment of the present invention are characterized by that it comprises an alumina ($Al_2O_3$) matrix comprising crystal grains from 0.5 to 10 μm in particle size, the alumina crystal grains having dispersed therein from 15 to 30% by volume of fine titanium diboride ($TiB_2$) particles 2 μm or less in particle size and from 5 to 30% by volume of fine silicon carbide (SiC) particles 2 μm or less in particle size.

The process for producing the ceramic composites according to an embodiment of the present invention comprises mixing fine alumina ($Al_2O_3$) particles 5 μm or less in diameter with from 15 to 40% by volume of fine titanium diboride ($TiB_2$) particles 2 μm or less in diameter, and then sintering the molding obtained from the resulting mixture at a sintering temperature of 1400° C. or higher.

The process for producing the ceramic composites according to another embodiment of the present invention comprises mixing fine alumina ($Al_2O_3$) particles 5 μm or less in particle size with from 5 to 30% by volume of each of fine titanium diboride ($TiB_2$) particles 2 μm or less in particle size and fine silicon carbide (SiC) particles 2 μm or less in particle size, and then sintering the molding obtained from the resulting mixture at a sintering temperature of 1500° C. or higher.

The present invention is characterized by that it provides a ceramic composite having improved in mechanical strength. This improvement was achieved by realizing a material comprising fine particles of $TiB_2$ or fine particles of both $TiB_2$ and SiC having dispersed inside the grains of alumina ceramics in a nanometer scale (i.e., a material composed of crystal grains being complexed in the level of minimum structural unit of a ceramic sintering). In such a sintered alumina comprising alumina crystal grains having dispersed therein fine grains of $TiB_2$ or SiC, the residual stresses generate between the alumina and those dispersed fine particles ascribed to the difference in thermal expansion coefficient. Accordingly, compressive stresses generate at the grain boundary between the neighboring alumina grains. Thus, the cracks inside the sintering are pinned or sealed, or even deflected by those compressive strains. This is the believed mechanism which prevents propagation of cracks inside the sintering.

In an embodiment according to the present invention, only fine particles of $TiB_2$ are dispersed inside the alumina grains. In another embodiment according to the present invention, fine particles of both $TiB_2$ and SiC are dispersed inside the alumina grains. It is characterized by that the sintered alumina is composed of alumina grains from 0.5 to 10 μm in diameter, and comprises dispersed therein $TiB_2$ and SiC grains 2 μm or less in particle size. It is characterized also by that the fine $TiB_2$ particles and optionally the fine SiC particles are homogeneously dispersed within the alumina matrix.

The ceramic composites according to the present invention is manufactured by a process which comprises mixing alumina powder composed of grains 5 μm or less in particle size with fine $TiB_2$ particles and optionally fine SiC grains both 2 μm or less in particle size, and then sintering a molding obtained from the resulting mixture.

To considerably increase the strength of the resulting sintering, it is required that the alumina matrix of the ceramic composites is controlled so that it may be composed of grains in the diameter range of from 0.5 to 10 μm. Thus, by then incorporating particles of $TiB_2$ and SiC as fine as 2 μm or less in particle size, those fine particles are readily included into the crystal grains of the alumina matrix during the sintering step.

The starting alumina powder should be composed of grains 5 μm or less in diameter. This enable ready sintering of the alumina grains. The fine particles of $TiB_2$ and SiC should be 2 μm or less in diameter. By thus controlling the size of those fine particles to this specified size range, they are easily incorporated into the alumina grains without generating microcracks in the alumina grains.

In the case of dispersing fine $TiB_2$ particles alone, amount of its addition is from 15 to 40% by volume. An addition of the fine $TiB_2$ particles within this specified range is effective for suppressing grain growth during the sintering, which, as a result provides an increased fracture strength and fracture toughness to the sintering ascribed to the formation of fine sintered microstructures.

When fine particles of both $TiB_2$ and SiC are added, they are added at an amount of from 5 to 30% by volume each. The addition of the fine $TiB_2$ and SiC particles within this specified range is effective for suppressing grain growth during the sintering, which, as a result provides an increased fracture strength and fracture toughness to the sintering ascribed to the formation of a fine sintered microstructure. Furthermore in this case, it is preferred that the addition of fine $TiB_2$ and SiC particles in total is in the range of from 10 to 40% by volume.

The fine $TiB_2$ and SiC powders for use as the starting material are those available by an industrial process.

It is require in the process for manufacturing the ceramic composites according to the present invention, that the alumina grains are densely sintered during the sintering step, and that those alumina grains contain homogeneously dispersed inclusions of fine $TiB_2$ or SiC particles therein. Suitable processes for sintering the ceramic composites according to the present invention include metallurgical techniques, hot pressing, pressureless sintering, and HIPing (Hot Isostatic Pressing) techniques. The sintering is carried out at 1500° C. or higher, and preferably in the temperature range of from 1500° to 1800° C.

PREFERRED EMBODIMENTS

The ceramic composites according to the present invention and the process for producing thereof are described in further detail with reference to non-limiting examples. However, it should be understood that the present invention is not to be construed as being limited to those examples.

EXAMPLES 1 TO 4, COMPARATIVE EXAMPLES 1 TO 4

The starting alumina powder was a commercially available powder, AKP-30 (trade name for an α-alumina powder composed of grains 0.4 μm in average diameter; a product of Sumitomo Chemical Company, Limited), and the starting $TiB_2$ powder was $TiB_2$-PF (a $TiB_2$ powder composed of grains 1.5 μm or less in average diameter; a product of Japan New Metal, Ltd.) which was classified to obtain grains 0.6 μm or less in diameter.

Seven powder mixtures were prepared by adding the thus classified $TiB_2$ powder with respect to alumina, at an amount by volume of 0%, 5%, 10%, 15%, 20%, 30%, and 40%, in correspondence to Comparative Example 1, Comparative Example 2, Comparative Example 3, Example 1, Example 2, Example 3, and Example 4, respectively. Each of the powder mixtures thus obtained was subjected to conventional ball milling technique in the pure ethanol with alumina balls for 24 hours. The slurry thus obtained was sufficiently dried, and was crushed by dry ball milling for 12 hours again. Thus was obtained the powder mixtures.

Then, about 48 g each of the resulting powder mixtures was charged into a graphite die (60 mm in inner diameter), and after subjecting the mixtures to precompression applied pressure of 10 MPa, the resulting compact was sintered using an frequency induction heating hot pressing apparatus (manufactured by Fuji Microwave Co., Ltd.) at temperatures shown in Table 1. The hot pressing was conducted by first elevating the temperature to a predetermined sintering temperature, and then holding the temperature constant for an hour in Argon gas atmosphere. The pressure applied to the molding was 30 MPa.

The resulting sintered bodies of ceramic composites were each cut into test pieces each at a specified dimension of 3×4×36 mm, according to the JIS R1601 standard three-point bending test. The bending strength was thus obtained on those test pieces at a span length of 30 mm and applying load at a crosshead speed of 0.5 mm/minute. The fracture toughness was measured by the IF (Indentation Fracture) method with indenter loads of 5 kg for a retention time of 10 seconds. The size of the constituent grains was measured by means of electron microscopy. The results are given in Table 1.

TABLE 1

| | Bending strength for $Al_2O_3$—$TiB_2$ composites varying in $TiB_2$ addition | | | | | |
|---|---|---|---|---|---|---|
| Sample No. | Blending ratio (vol. %) | | Sintering Temperature (°C.) | Grain size (μm) | | Bending Strength (MPa) |
| | $Al_2O_3$ | $TiB_2$ | | $Al_2O_3$ | $TiB_2$ | |
| Comp. Ex. 1 | 100 | 0 | 1400 | <5 | — | 400 |
| Comp. Ex. 2 | 95 | 5 | 1500 | <4 | <0.6 | *500 |
| Comp. Ex. 3 | 90 | 10 | 1500 | <3 | <0.6 | 600 |
| Ex. 1 | 85 | 15 | 1550 | <3 | <0.6 | 800 |
| Ex. 2 | 80 | 20 | 1600 | <2 | <0.6 | 950 |
| Ex. 3 | 70 | 30 | 1600 | <2 | <0.6 | 1050 |
| Ex. 4 | 60 | 40 | 1650 | <1.5 | <0.6 | 900 |

It can be seen clearly from Table 1 that the bending strength of $Al_2O_3$-$TiB_2$ composites to improves by adding $TiB_2$ in the range of from 15 to 40% by volume. The fracture surface after breakage was observed on each of the specimens having subjected to testing. Fracture surface was observed to be confined intergranular fracture because of the fine $TiB_2$ particles homogeneously dispersed within the alumina grains. The fracture plane obtained after the measurement of the fracture toughness was polished, and the cracks in this plane was observed. The cracks were observed to be deflected by the relatively coarse $TiB_2$ particles having dispersed in the grain boundary, and to propagate along a very complicated path. Accordingly, it can be understood that the fracture strength of the ceramic composites according to the present invention is improved by the synergetic effect resulting from the addition of $TiB_2$ particles which provide finely divided texture and change in the fracture mechanism, as well as the deflection of the crack propagation which increases the fracture toughness.

Further, the high temperature strength of $Al_2O_3$-$TiB_2$ composites obtained in Example 2 above and containing 20% by volume $TiB_2$ was measured. The results are given in Table 2.

TABLE 2

| High temperature bending strength of 20 vol % $TiB_2$—$Al_2O_3$ composites | | | | | | | |
|---|---|---|---|---|---|---|---|
| Temp. (°C.) | 200 | 400 | 600 | 800 | 1000 | 1200 | 1300 |
| Bending Strength (MPa) | 940 | 940 | 960 | 1000 | 1050 | 900 | 520 |

Table 2 reads that $Al_2O_3$-$TiB_2$ composites according to the present invention maintain the bending strength at the room temperature to a temperature as high as 1200° C. This is probably ascribed to the dispersed $TiB_2$ particles which play the role of suppressing the slips at the grain boundary. Furthermore, upon observation of the fracture surface, the fracture mechanism was seen to be an intergranular fracture, the same as that for the fracture occurring at the room temperature.

EXAMPLES 5 TO 8, COMPARATIVE EXAMPLE 4

The starting alumina powder was a commercially available powder AKP-30 (trade name for an α-alumina powder composed of grains 0.4 μm in average diameter; a product of Sumitomo Chemical Company, Limited). The starting $TiB_2$ powder was $TiB_2$-PF (a $TiB_2$ powder composed of grains 1.5 μm or less in average particle size; a product of Japan New Metal, Ltd.) which was classified to obtain grains 0.6 μm or less in particle size, and the starting SiC powder was β-Rundum Ultra Fine (an SiC powder composed of grains 0.3 μm in average particle size; a product of Ibiden Co., Ltd.).

Seven powder mixtures were prepared by adding the thus classified $TiB_2$ powder and fine SiC powder with respect to alumina, at an amount by volume as shown in Table 3. Each of the powder mixtures thus obtained was subjected to conventional ball milling technique in the pure ethanol with alumina balls for 24 hours. The slurry thus obtained was sufficiently dried, and was crushed by dry ball milling technique for 12 hours again. Thus was obtained the starting powder.

Then, in a similar manner as those in the foregoing Examples and Comparative Examples, about 48 g each of the resulting powder mixtures was charged into a graphite die (60 mm in inner diameter), and after subjecting the mixtures to precompression applied pressure of 10 MPa, the resulting compact was sintered using Frequency induction heating hot pressing apparatus (manufactured by Fuji Microwave Co., Ltd.) at temperatures shown in Table 3. The hot pressing was conducted by first elevating the temperature to a predetermined sintering temperature, and then maintaining the temperature constant for an hour in Argon gas atmosphere. The pressure applied to the molding was 30 MPa.

The resulting sintered bodies of ceramic composites were each cut into test rectangular pieces each using a diamond cutter, and the four faces thereof were polished using a diamond wheel to obtain a surface roughness of #1000. By thus machining, each of the test specimens were finished to a specified dimension of 3×4×36 mm, according to the JIS R1601 standard three-point bending test. The bending strength was measured on those test pieces at a span length of 30 mm and load was applied at a crosshead speed of 0.5 mm/minute. The fracture toughness was measured by an IF (Indentation Fracture) method with indenter loads of 5 kg for a retention time of 10 seconds. The results are given in Table 3.

TABLE 3

| Bending strength for $Al_2O_3$—$TiB_2$—SiC composites varying in $TiB_2$/SiC addition | | | | | | |
|---|---|---|---|---|---|---|
| Sample Nos. | Blending ratio (vol. %) | | | Sintering Temperature (°C.) | Bending Strength (MPa) | Fracture Toughness (MPam$^{\frac{1}{2}}$) |
| | $Al_2O_3$ | $TiB_2$ | SiC | | | |
| Comp. No. 1 | 100 | 0 | 0 | 1400 | 400 | 3.8 |
| Ex. 2 | 80 | 20 | 0 | 1600 | 950 | 5.8 |
| Ex. 5 | 70 | 20 | 10 | 1700 | 1220 | 7.2 |
| Ex. 6 | 65 | 30 | 5 | 1800 | 1180 | 7.3 |
| Ex. 7 | 70 | 15 | 15 | 1750 | 1150 | 6.8 |
| Ex. 8 | 70 | 10 | 20 | 1750 | 1100 | 6.7 |
| Comp. Ex. 4 | 80 | 0 | 20 | 1700 | 950 | 5.2 |

It can be seen clearly from Table 3 that the ceramic composites according to the second embodiment of the present invention exhibits a bending strength about three times as large as and a fracture strength about twice as large as those of the monolithic alumina ceramics. It can be seen, moreover, that the bending strength and the fracture toughness of the ceramic composites according to the present invention are both higher than those of the binary $Al_2O_3$-$TiB_2$ and $Al_2O_3$-SiC systems.

The fracture surface obtained after the measurements of bending strength and fracture toughness were observed. The cracks were observed to propagate along a very complicated path due to the $TiB_2$ and SiC particles having dispersed in the grains. Furthermore, the fracture surface was understood to occur as an intergranular fracture.

Accordingly, it can be understood that the fracture toughness of the ceramic composites according to the present invention is improved by fine $TiB_2$ and SiC particles having dispersed within the grains of the matrix, which deflect the cracks and the like. The bending strength in this case is increased by the finely divide texture and the improvement is seen in fracture toughness.

As explained in detail in the foregoing, the ceramic composites according to the present invention consist of a dense and fine structure, and is thereby significantly improved in mechanical properties such as bending strength. Accordingly, the ceramic composites according to the present invention is particularly suited for use as heat resistant materials, cutting tool materials, wear-resistant members, refractories, and as structural materials having excellent resistance against thermal shock.

While the invention has been described in detail and with reference to specific embodiments thereof, it will be apparent to one skilled in the art that various changes and modifications can be made therein without departing from the spirit and scope thereof.

What is claimed is:

1. A ceramic composites consisting essentially of:
   a polycrystalline alumina matrix having a grain size of from 0.5 to 10 μm, fine particles of $TiB_2$, and
fine powder of SiC,
said fine particles of $TiB_2$ and said powder of SiC being 2 μm or less in diameter and being dispersed within said alumina grains, said ceramic composites containing from 5 to 30% by volume of $TiB_2$, from 5 to 30% by volume of SiC, and from 60 to 90% by volume of alumina.

2. The ceramic composite as claimed in claim 1, wherein the content of fine particles of $TiB_2$ and SiC in total is from 10 to 40% by volume.

3. A process for manufacturing composite ceramics, which comprises:
mixing materials consisting essential of from 5 to 30% by volume each of fine $TiB_2$ particles 2 μm or less in diameter and fine SiC powder 2 μm or less in diameter with from 40 to 90% by volume of fine alumina particles 5 μm or less in diameter;
molding the resulting powder mixture; and
sintering the molding thus obtained at a temperature not lower than 1500° C.

4. The process for manufacturing ceramic composites as claimed in claim 3, wherein, fine $TiB_2$ particles are initially added and mixed with fine-grained alumina at first, and fine SiC powder are added subsequently to the mixture.

5. The ceramic composite as claimed in claim 1 wherein said ceramic composite has bending strength between 1100 and 1220 MPa, and fracture toughness between 6.7 and 7.2 $MPam^{\frac{1}{2}}$.

6. The ceramic composite as claimed in claim 1, wherein said $TiB_2$ particles have a diameter of 0.6 micro meters or less, and said SiC powder has an average diameter of 0.3 micro meters.

7. The process for manufacturing ceramic composite as claimed in claim 4, wherein said ceramic composite has bending strength between 1100 and 1220 MPa, and fracture toughness between 6.7 and 7.2 $MPam^{\frac{1}{2}}$.

8. The process for manufacturing ceramic composite as claimed in claim 4, wherein said $TiB_2$ particles have a diameter of 0.6 micro meters or less, and said SiC powder has an average diameter of 0.3 micro meters.

* * * * *

UNITED STATES PATENT AND TRADEMARK OFFICE
CERTIFICATE OF CORRECTION

PATENT NO. : 5,324,693

DATED : June 28, 1994

INVENTOR(S) : Ryuichi Matsuki et al

It is certified that error appears in the above-identified patent and that said Letters Patent is hereby corrected as shown below:

Title Page:

Item [21], U.S. Patent Application Number, change "959,958" to --959,957--.

Signed and Sealed this

Thirtieth Day of August, 1994

Attest:

*Attesting Officer*

BRUCE LEHMAN

*Commissioner of Patents and Trademarks*